United States Patent
Yang et al.

(10) Patent No.: US 12,526,060 B2
(45) Date of Patent: Jan. 13, 2026

(54) METHOD FOR MEASURING SENSITIVITY OF RECEIVER

(71) Applicant: MEDIATEK INC., Hsin-Chu (TW)

(72) Inventors: Sin-Han Yang, Hsinchu (TW); Chen-Jui Hsu, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 76 days.

(21) Appl. No.: 18/646,748

(22) Filed: Apr. 25, 2024

(65) Prior Publication Data

US 2024/0364433 A1    Oct. 31, 2024

Related U.S. Application Data

(60) Provisional application No. 63/462,225, filed on Apr. 26, 2023.

(51) Int. Cl.
*H04B 17/20* (2015.01)
*H04B 17/21* (2015.01)

(52) U.S. Cl.
CPC ........... *H04B 17/203* (2023.05); *H04B 17/21* (2015.01)

(58) Field of Classification Search
CPC .... H04B 17/00; H04B 17/203; H04B 17/201; H04B 17/202; H04B 17/204; H04B 17/21; H04B 17/22; H04B 17/221; H04B 17/20
See application file for complete search history.

(56) References Cited

U.S. PATENT DOCUMENTS

| | | | |
|---|---|---|---|
| 5,191,294 A * | 3/1993 | Grace | G01R 29/26 324/613 |
| 10,666,542 B1 * | 5/2020 | Olgaard | H04L 43/50 |
| 10,673,545 B1 * | 6/2020 | Kurvathodil | H04B 17/13 |
| 2007/0207756 A1 * | 9/2007 | Qi | H04B 17/20 455/67.11 |
| 2011/0136485 A1 | 6/2011 | Gordiyenko | |
| 2013/0158935 A1 * | 6/2013 | Carlson | H04B 17/21 702/108 |
| 2016/0248462 A1 * | 8/2016 | Danilenko | H04B 1/18 |
| 2018/0109967 A1 | 4/2018 | Ghassemzadeh | |
| 2018/0152254 A1 * | 5/2018 | Vaucher | H03G 3/001 |

FOREIGN PATENT DOCUMENTS

TW    201832530 A    9/2018

* cited by examiner

*Primary Examiner* — Khanh C Tran
(74) *Attorney, Agent, or Firm* — Winston Hsu

(57) ABSTRACT

A method for measuring a sensitivity of a receiver is provided. The method includes: during a first stage, controlling a signal generator to transmit an input test signal to an input node of the receiver, wherein the receiver generates an output test signal on a first output node of the receiver according to the input test signal; calculating a path loss from the input node of the receiver to the first output node of the receiver according to the input test signal and the output test signal; during a second stage, measuring an output noise power on a second output node of the receiver after a load is connected to the input node of the receiver; and calculating the sensitivity of the receiver according to the path loss and the output noise power. The load may be an antenna or a 50-ohm impedance load.

20 Claims, 8 Drawing Sheets

METHOD FOR MEASURING SENSITIVITY OF RECEIVER

CROSS REFERENCE TO RELATED APPLICATIONS

This application claims the benefit of U.S. Provisional Application No. 63/462,225, filed on Apr. 26, 2023. The content of the application is incorporated herein by reference.

BACKGROUND

The present invention is related to sensitivity estimation, and more particularly, to a method for measuring a sensitivity of a receiver.

When testing a sensitivity of a receiver, an instrument is typically required to output a modulated signal with a range of power levels to allow the receiver to receive and process the modulated signal. The modulated signal received by the receiver needs to be demodulated to generate a demodulated signal, where the demodulated signal is compared with a reference signal, in order to determine which level of the modulated signal received by the receiver may be correctly demodulated (e.g. with a sufficient low error rate), which is referred to as a sensitivity level of the receiver.

The test method mentioned above needs to demodulate the modulated signal, which introduce synchronization requirements, and an overall test flow is therefore complicated. Thus, there is a need for a novel method, which can estimate the sensitivity of the receiver without demodulating signal(s) received by the receiver.

SUMMARY

An objective of the present invention is to provide a method for measuring a sensitivity of a receiver, which can improve an overall efficiency of estimating the sensitivity of the receiver without introducing any side effect or in a way that is less likely to introduce side effects.

At least one embodiment of the present invention provides a method for measuring a sensitivity of a receiver. The method comprises: during a first stage, controlling a signal generator to transmit an input test signal to an input node of the receiver, wherein the receiver generates an output test signal on a first output node of the receiver according to the input test signal; calculating a path loss from the input node of the receiver to the first output node of the receiver according to the input test signal and the output test signal; during a second stage, measuring an output noise power on a second output node of the receiver after a load is connected to the input node of the receiver, wherein the second output node is the same as the first output node or is not the same as the first output node; and calculating the sensitivity of the receiver according to the path loss and the output noise power. The load may be an antenna or a 50-ohm impedance load.

At least one embodiment of the present invention provides a method for measuring a sensitivity of a receiver. The method comprises: controlling a signal generator to transmit an input test signal to an input node of the receiver, wherein the receiver generates an output test signal on an output node of the receiver according to the input test signal, and the output test signal comprises at least one tone and a noise, wherein the at least one tone is a single tone or multiple tones; calculating an output signal-to-noise ratio (SNR) of the receiver according to a power of the at least one tone and a power of the noise; and calculating the sensitivity of the receiver according to the output SNR.

The methods provided by the embodiments of the present invention can indirectly derive the sensitivity of the receiver by measuring and calculating associated parameters such as the path loss, the output noise power or the SNR. In addition, the path loss is a parameter which can be regarded as known information which is already derived from an existing calibration such as a received signal strength indicator (RSSI) calibration. Based on the relationship between the sensitivity and the above parameters, the sensitivity can be estimated without demodulation tasks, thereby simplifying an overall test flow.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
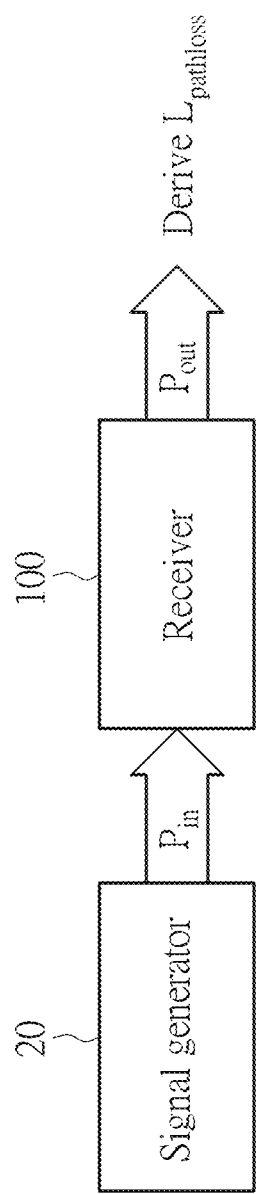
FIG. 1 is a diagram illustrating estimation of a path loss of a receiver according to an embodiment of the present invention.

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

A sensitivity of a receiver can be determined by several factors such as a thermal noise, a noise figure of the receiver, a first frequency range on which the sensitivity needs to be measured, and signal-to-noise ratio (SNR) requirement of a demodulator coupled to an output port of the receiver. For example, the sensitivity of the receiver may be calculated by the following equations:

$$\text{Sensitivity} = -174 + NF + BW + SNR_{req} \quad \text{(eq1)}$$

$$NF = SNR_{in} - SNR_{out} \quad \text{(eq2)}$$

$$SNR_{in} = S_{in} - N_{in} = \quad \text{(eq3)}$$
$$SGP_{ant} - 10 \times \log(K \times T_0 \times B) = SGP_{ant} - (-174 + 10 \times \log(B))$$

$$SNR_{out} = S_{out} - N_{out} = SGP_{DFE} - \text{Noise}_{DFE} \quad \text{(eq4)}$$

$$NF = (SGRP_{ant} - SGP_{DFE}) + \text{Noise}_{DFE} - (-174 + BW) \quad \text{(eq5)}$$

In the equation eq1, "−174" is a thermal noise related value in dBm/Hz, NF represents the noise figure in dB, and $SNR_{req}$ represents the SNR requirement in dB. As illustrated by the equation eq2, the noise figures NF may be calculated according to an input SNR (which may be expressed by $SNR_{in}$ in dB) and an output SNR (which may be expressed by $SNR_{out}$ in dB) of the receiver. As illustrated by the equation eq3, the input SNR may be calculated according to an input signal power (which may be expressed by $S_{in}$ in dBm) and an input noise power (which may be expressed by $N_{in}$ in dBm). The input noise power may be an input noise power at a normal temperature. In addition, the input signal power $S_{in}$ may be an antenna signal power (which may be expressed by $SGP_{ant}$ in dBm) received by the receiver, and the input noise power $N_{in}$ may be an input thermal noise power (which may be calculated according to a Boltzmann's constant K, a room temperature $T_0$ such as 290K, and a bandwidth B of the first frequency range on which the sensitivity needs to be measured, which may be in Hz), where $10 \times \log(K \times T_0) = -174$ and $10 \times \log(B) = BW$. As illustrated by the equation eq4, the output SNR $SNR_{out}$ may be calculated according to an output signal power (which is expressed by $S_{out}$ in dBm) and an output noise power (which is expressed by $N_{out}$ in dBm). In addition, the output signal power may be a digital front-end (DFE) signal power (which is expressed by $SGP_{DFE}$ in dBm) output from a DFE circuit of the receiver, and the output noise power may be a DFE noise power (which is expressed by $\text{Noise}_{DFE}$ in dBm) measured on an output node of the DFE circuit mentioned above. According to the equations eq3 and eq4, the noise figure NF may be derived as illustrated by the equations eq5. By substituting the derivation of the equation eq5 into the equation eq1, the sensitivity of the receiver may be calculated as follows:

$$\text{Sensitivity} = (SGP_{ant} - SGP_{DFE}) + \text{Noise}_{DFE} + SNR_{req} = \quad \text{(eq6)}$$
$$-G_{real} + \text{Noise}_{DFE} + SNR_{req}$$

In the equation eq6, $G_{real}$ may represent a measured gain such as a real gain of the receiver in dB, where the real gain $G_{real}$ may be expressed by a predefined gain such as an ideal gain with a path loss, and the sensitivity of the receiver may be illustrated as follows:

$$\text{Sensitivity} = -(G_{ideal} - L_{pathloss}) + \text{Noise}_{DFE} + SNR_{req} \quad \text{(eq7)}$$

In the equation eq7, $G_{ideal}$ represents the ideal gain in dB, and $L_{pathloss}$ represents the path loss in dB. It should be noted that the ideal gain $G_{ideal}$ and the SNR requirement $SNR_{req}$ are typically known information (e.g. which has been derived in existing design flows) when testing the sensitivity of the receiver, and the path loss $L_{pathloss}$ may be derived when performing a received signal strength indicator (RSSI) calibration. Thus, the sensitivity of the receiver can be derived after the DFE noise power $\text{Noise}_{DFE}$ is measured.

FIG. 1 is a diagram illustrating estimation of the path loss $L_{pathloss}$ of a receiver 100 according to an embodiment of the present invention. During a calibration stage (e.g. a stage for deriving the real gain $G_{real}$ and/or the path loss $L_{pathloss}$), the receiver 100 may receive an input test signal $P_{in}$ via an input port thereof (e.g. the input port can be connected to an antenna, when the input port is connected to the signal generator 20, the input port is not connected to the antenna) from a signal generator 20, and the receiver 100 may generate an output test signal $P_{out}$ according to the input test signal $P_{in}$, in order to derive the real gain $G_{real}$ and/or the path loss $L_{pathloss}$.

Figure 2:
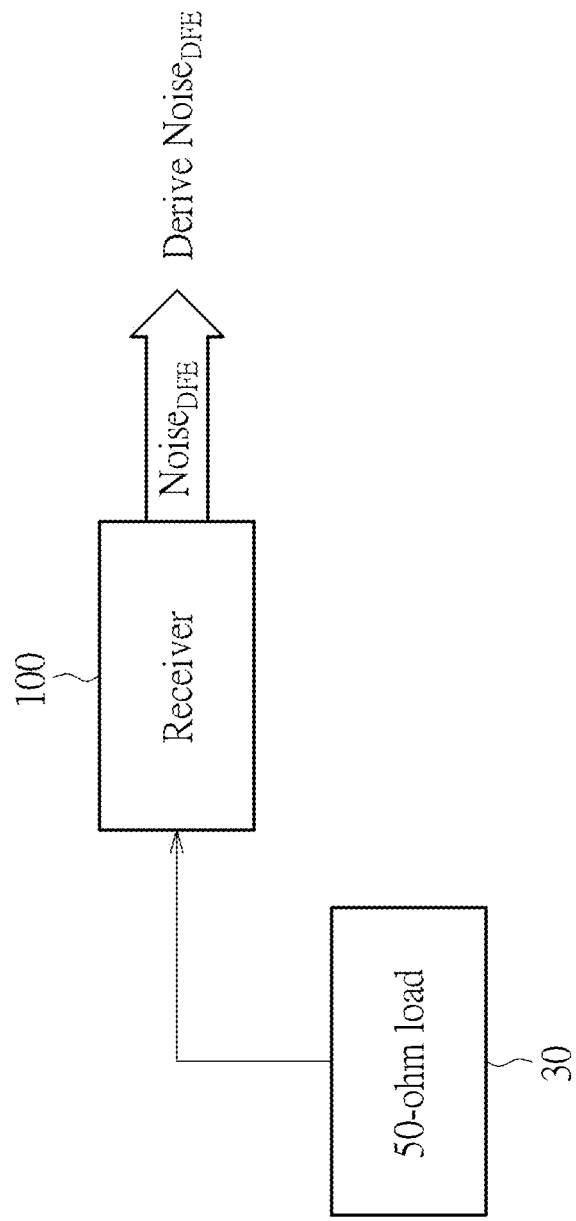
FIG. 2 is a diagram illustrating estimation of an output noise power of a receiver according to an embodiment of the present invention.

FIG. 2 is a diagram illustrating estimation of an output noise power (e.g. the DFE noise power $\text{Noise}_{DFE}$) of the receiver 100 according to an embodiment of the present invention. During a self-test stage (e.g. a stage for self-testing a sensitivity of the receiver 100 without receiving external test signals), the input port of the receiver 100 may be coupled to a load such as a 50-ohm load 30 (which emulates an equivalent impedance of the signal generator 20, making the calibration stage and the self-test stage have same or similar environment), where the signal generator 20 is not needed during the self-test stage, and is therefore disconnected. Thus, without any additional signal transmitted to the input port of the receiver 100, a total power measured on an output port of the receiver 100 may be a noise power on the output port (e.g. the DFE noise power $\text{Noise}_{DFE}$ on the output node of the DFE circuit mentioned above). Thus, after the path loss $L_{pathloss}$ and the DFE noise power $\text{Noise}_{DFE}$ are derived, the sensitivity of the receiver 100 may be calculated according to the equation eq7. In the self-test stage, the load may be an antenna or a 50-ohm impedance load. When the load is the antenna, the noise power on the output port of the receiver 100 is measured in a shielding room without an interference.

Figure 3:
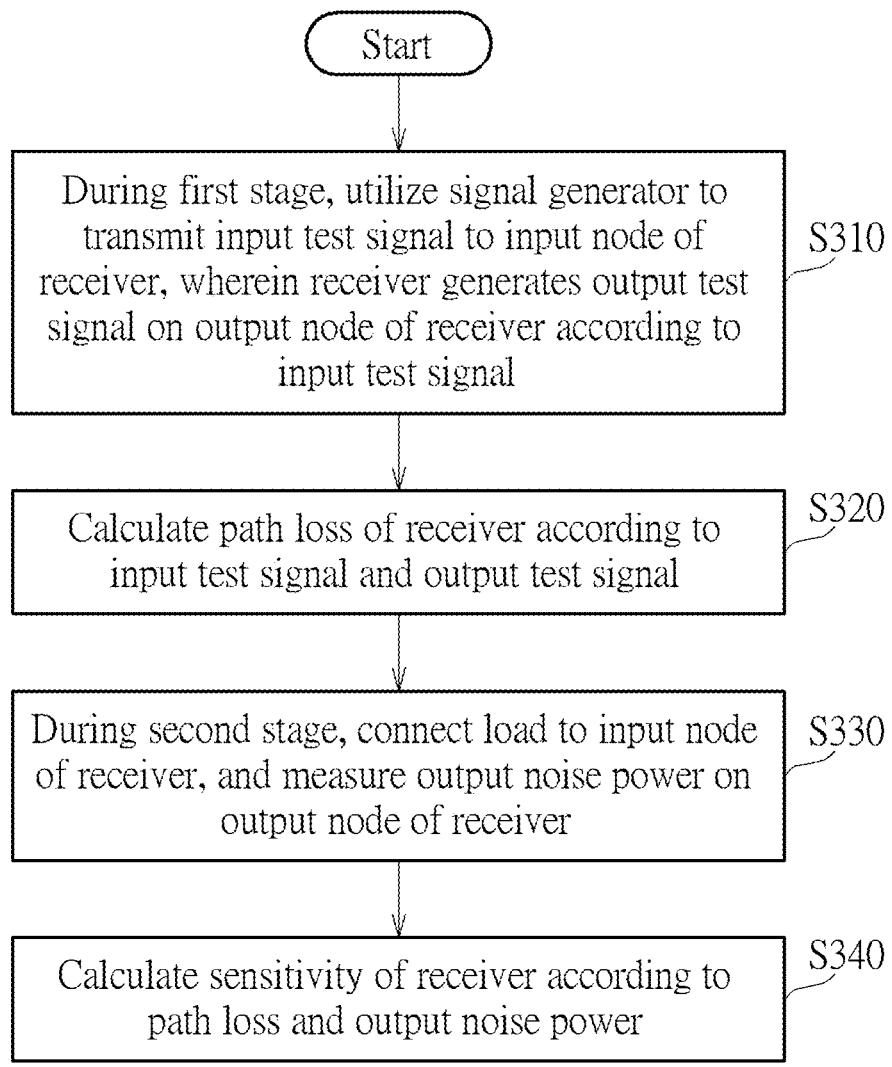
FIG. 3 is a diagram illustrating a working flow of a method for measuring a sensitivity of a receiver according to an embodiment of the present invention.

FIG. 3 is a diagram illustrating a working flow of a method for measuring a sensitivity of a receiver (e.g. the receiver 100) according to an embodiment of the present invention, where the working flow shown in FIG. 3 may be controlled by a host device such as a computer executing corresponding software module and/or management engine, wherein the management engine is also referred to as the power measurement engine. It should be noted that the working flow shown in FIG. 3 is for illustrative purposes only, and is not meant to be a limitation of the present invention. For example, one or more steps may be added, deleted or modified in the working flow shown in FIG. 3. In addition, if a same result can be obtained, these steps do not have to be executed in the exact order shown in FIG. 3.

In Step S310, during a first stage (e.g. the calibration stage mentioned above), the host device may control a signal generator (e.g. the signal generator 20 shown in FIG. 1) to transmit an input test signal (e.g. the input test signal $P_{in}$ shown in FIG. 1) to an input node of the receiver (e.g. the receiver 100 shown in FIG. 1), wherein the receiver generates an output test signal (e.g. the output test signal $P_{out}$ shown in FIG. 1) on a first output node of the receiver according to the input test signal.

In Step S320, the host device may calculate a path loss (e.g. the path loss $L_{pathloss}$) from the input node of the receiver to the first output node of the receiver according to the input test signal and the output test signal.

In Step S330, during a second stage (e.g. the self-test stage mentioned above), the host device (or a test engineer) may connect a load (e.g. the 50-ohm load 30 shown in FIG. 2) to the input node of the receiver (e.g. the receiver 100 shown in FIG. 2), and the host device may measure an output noise power (e.g. the DFE noise power Noise$_{DFE}$) on a second output node of the receiver, wherein the second output node is the same as the first output node or is not the same as the first output node.

In Step S340, the host device may calculate the sensitivity of the receiver according to the path loss and the output noise power.

Figure 4:
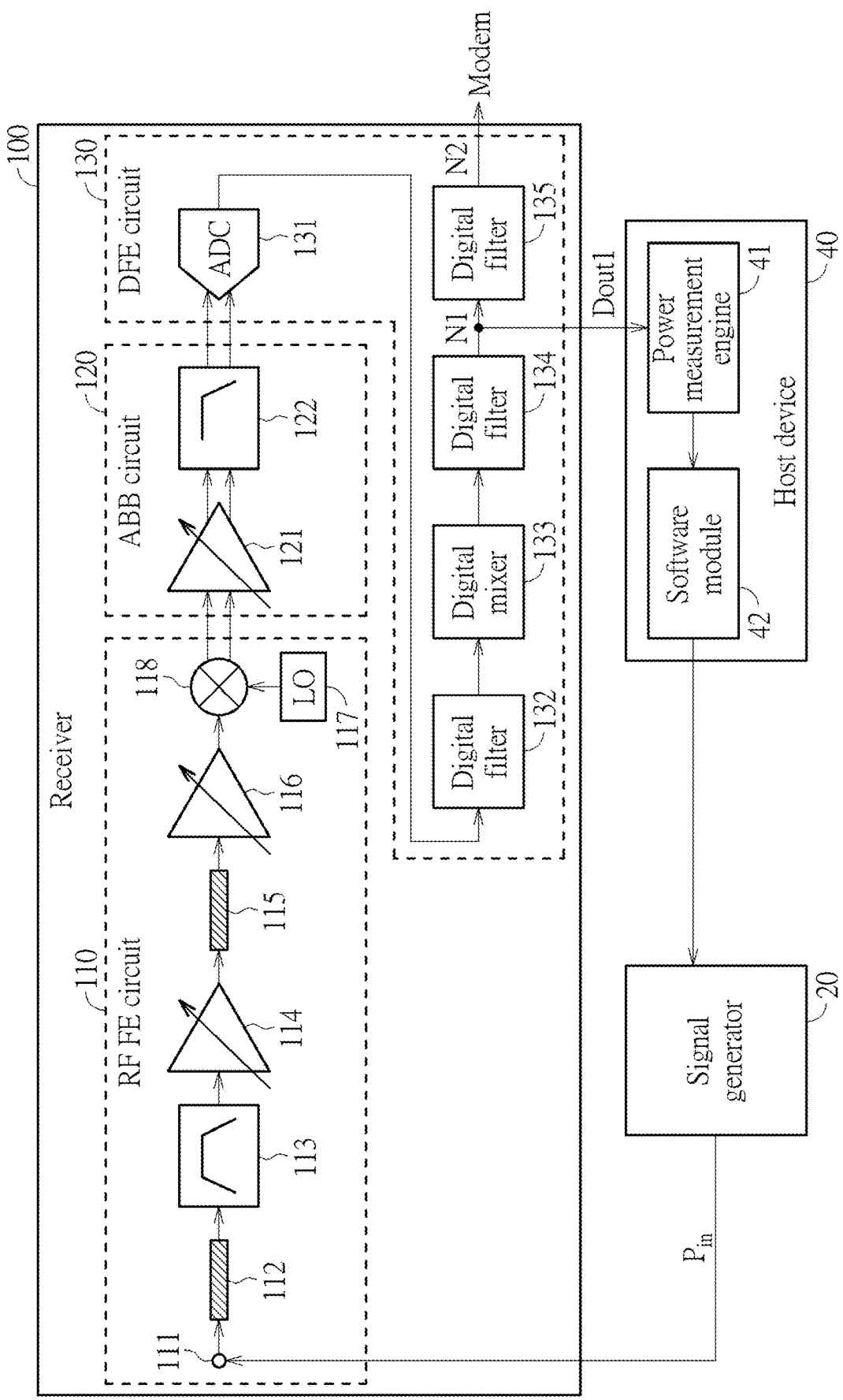
FIG. 4 is a diagram illustrating details of estimation of a path loss of a receiver according to an embodiment of the present invention.

FIG. 4 is a diagram illustrating details of estimation of the path loss $L_{pathloss}$ of the receiver 100 according to an embodiment of the present invention. In this embodiment, the receiver 100 may comprise a radio frequency (RF) front-end (FE) circuit 110, an analog baseband (ABB) circuit 120 and a DFE circuit 130. In detail, the RF FE circuit 110 may comprise an antenna port 110 (which can be coupled to the antenna), a filter 113 (which is coupled to the antenna port 110 via a printed circuit board (PCB) trace 112), a low noise amplifier (LNA) 114, a LNA 116 (which is coupled to the LNA 114 via a PCB trace 115), a local oscillator (LO) 117 and a mixer 118. The ABB circuit 120 may comprise a transimpedance amplifier (TIA) 121 and a low pass filter 122. The DFE circuit 130 may comprise an analog-to-digital converter (ADC) 131, a first filter stage such as a digital filter 132, a digital mixer 133, a second filter stage such as a digital filter 134, and a third filter stage such as a digital filter 135. In addition, one or more nodes of the DFE circuit 130 may be an output port of the receiver 100. In some embodiment, an output node N1 coupled to an output terminal of the digital filter 134 and an input terminal of the digital filter 135 may be the output node of the receiver 100 for measuring $L_{pathloss}$. In some embodiment, an output node N2 coupled to an output terminal of the filter 135 may be the output node for measuring $L_{pathloss}$ and the output port of the receiver 100. In this embodiment, the output node N2 may be further coupled to an input terminal of a demodulator such as a modulator-demodulator device (Modem). Operations of the above components within the receiver 100 are well known by those skilled in this art, and will not be described in detail for brevity. Note that the antenna port 110, the filter 113 and the LNA 114 may be off-chip components, and the rest of the components within the receiver 100 may be integrated in a chip, but the present invention is not limited thereto. A host device 40 may be configured to execute a software module 42 and/or a power measurement engine 41, in order to control operations of the method shown in FIG. 3.

In this embodiment, the signal generator 20 may be coupled to the antenna port 111 during the calibration stage (e.g. a stage for performing the RSSI calibration), and more particularly, the host device 40 (which executing the software module 42) may control the signal generator 20 to output the input test signal $P_{in}$ with a predefined power (e.g. settings of the signal generator 20). The host device 40 (which executing the software module 42) may obtain a power of the input test signal $P_{in}$ (e.g. the power of the input test signal $P_{in}$ at a predetermined input frequency) based on the predefined power. In some embodiment, the power of the input test signal $P_{in}$ is obtained based on the predefined power and a pathloss between the signal generator 20 and the antenna port 111. In some embodiment, the host device 40 may measure the power of the input test signal $P_{in}$ by probing the antenna port 111, but the present invention is not limited thereto. In some embodiment, the input test signal $P_{in}$ may be a continuous wave tone. In some embodiment, the input test signal $P_{in}$ may be a signal with multiple tones.

In this embodiment, the input test signal $P_{in}$ (which may be fixed at a constant power level) may be transferred and processed by the components within the receiver 100 stage by stage, and the receiver 100 may generate an output test signal such as digital raw data Dout1 (which may be an example of the output test signal $P_{out}$ shown in FIG. 1) on the output node N1 according to the input test signal $P_{in}$. The host device 40 may utilize a power measurement engine 41 (which may be implemented by hardware, firmware or software) to measure a power of the output test signal $P_{out}$ (e.g. the power of the output test signal $P_{out}$ at a second frequency range, wherein the second frequency range corresponds to the first frequency range on which sensitivity needs to be measured, for example, the second frequency range may be obtained by down-converting the first frequency range) on the output node N1 according to the digital raw data Dout1, and transfers information of the power of the output test signal $P_{out}$ to the software module 42. In detail, the host device 40 (e.g. power measurement engine 41) may receive the digital raw data Dout1 in the second frequency range, and average the squared digital raw data Dout1 during a certain period of time. With this arrangement, the power of the output test signal $P_{out}$ at the second frequency range can be measured. It is noted that other methods may be used to measure the power of the output test signal Pout, for example, the power of the output test signal $P_{out}$ may be derived by a frequency domain method.

The software module 42 may calculate the path loss $L_{pathloss}$ (e.g. a path loss from the antenna port 111 to the output node N1) according to the power of the input test signal $P_{in}$, the power of the output test signal $P_{out}$ and a predefined gain of the receiver 100 (e.g. an ideal gain $G_{ideal1}$ from the antenna port 111 to the output node N1).

The software module 42 may calculate the path loss $L_{pathloss}$ based on the following:

$$L_{pathloss} = G_{ideal1} - G_{real1} = G_{ideal1} - [P_{out} - P_{in}]$$

Alternatively, $L_{pathloss} = G_{ideal1} - G_{real1} =$ $$G_{ideal1} - [P_{out} - G_{real1}] - [P_{out} - G_{ideal1}] = P_{in} - [P_{out} - G_{ideal1}]$$

In detail, the host device 40 (e.g. the software module 42 running thereon) may calculate a measured gain (e.g. a real gain $G_{real1}$ from the antenna port 111 to the output node N1) according to the input test signal $P_{in}$ and the output test signal $P_{out}$, and then calculate the path loss $L_{pathloss}$ according to the ideal gain $G_{ideal1}$ of the receiver 100 and the measured gain (e.g. calculating a difference between the ideal gain $G_{ideal1}$ and the measured gain).

Figure 5:
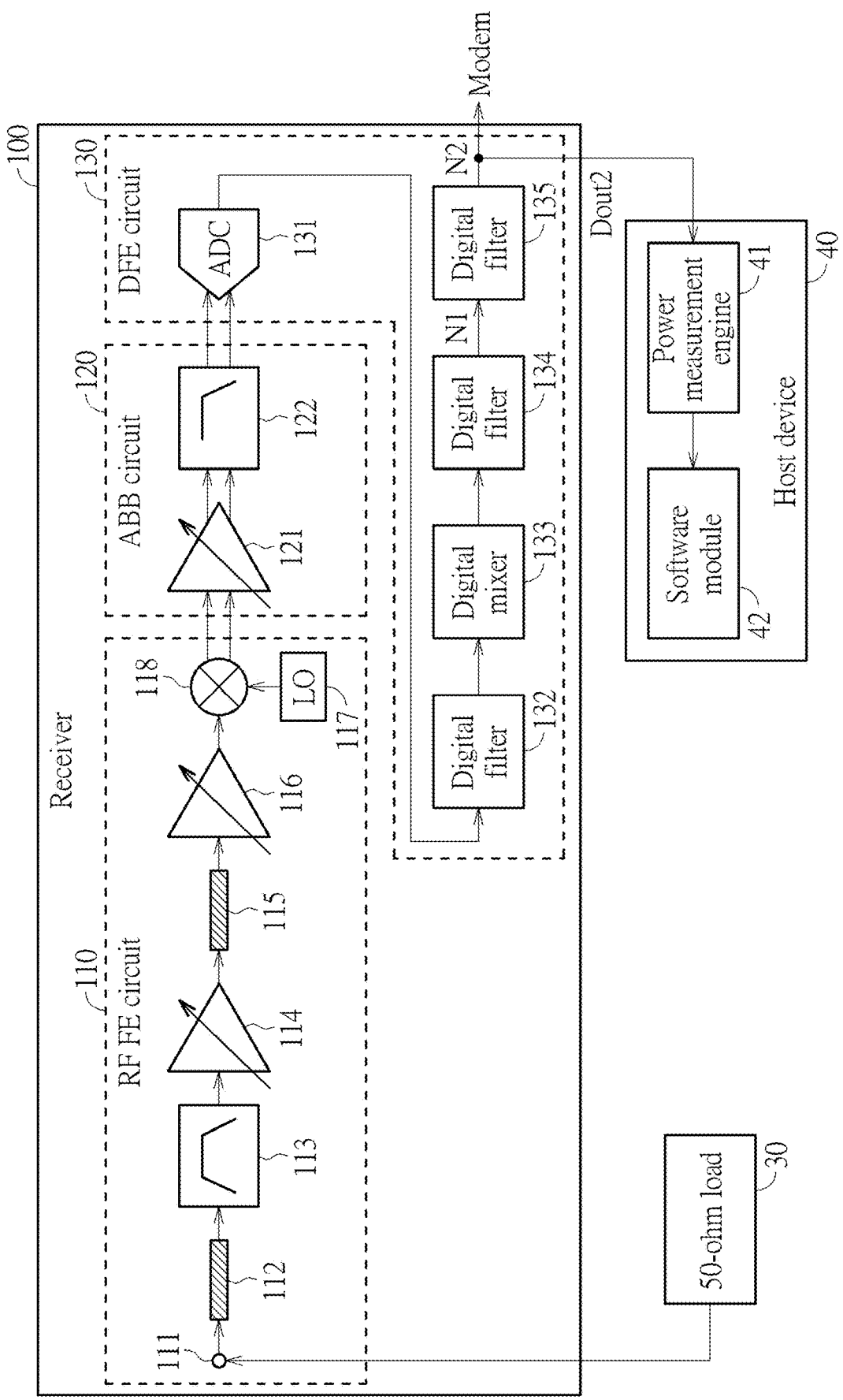
FIG. 5 is a diagram illustrating details of estimation of an output noise power of a receiver according to an embodiment of the present invention.

FIG. 5 is a diagram illustrating details of estimation of an output noise power (e.g. the DFE noise power Noise$_{DFE}$) of the receiver 100 according to an embodiment of the present invention. As shown in FIG. 5, the 50-ohm load may be coupled to the antenna port 111 during the self-test stage (e.g. a stage for measuring the DFE noise power Noise$_{DFE}$ and deriving the sensitivity of the receiver 100), and more particularly, operations of measuring the DFE noise power Noise$_{DFE}$ on the at least one output node (e.g. the output node N2) of the receiver 100 is performed under a condition where the receiver 100 and the signal generator 20 are disconnected (e.g. the signal generator 20 may be removed).

Without any input test signal, the receiver 100 may generate such as digital raw data Dout2 on the output node N2 due to noise. Thus, the host device 40 (e.g. the power measurement engine 41 running thereon) may receive the digital raw data Dout2 which represents the noise in a second frequency range corresponds to a first frequency range on which the sensitivity needs to be measured, where power measurement engine 41 may performs a fast fourier transform (FFT) upon the digital raw data Dout2 to generate an FFT result, and integrates the FFT result in the second frequency range in order to derive the DFE noise power $\text{Noise}_{DFE}$. With this arrangement, the DFE noise power NoiseDFE are measured at the second frequency range. It should be noted that the frequency of the input test signal $P_{in}$ (which is tested during the calibration stage) is within the first frequency range or adjacent to the first frequency range. Alternatively, the host device 40 (e.g. power measurement engine 41) may receive the digital raw data Dout2 in the second frequency range, and average the squared digital raw data Dout2 during a certain period of time. With this arrangement, the DFE noise power $\text{Noise}_{DFE}$ can be measured at the second frequency range. The software module 42 may calculate the sensitivity of the receiver 100 according to a predefined gain of the receiver 100 (e.g. an ideal gain $G_{ideal2}$ from the antenna port 111 to the output node N2), the SNR requirement (e.g. the SNR requirement $\text{SNR}_{req}$ mentioned above) of the demodulator coupled to the receiver 100 (e.g. the Modem coupled to the output node N2 of the receiver 100), the path loss $L_{pathloss}$ and the DFE noise power $\text{Noise}_{DFE}$. In particular, the SNR requirement $\text{SNR}_{req}$ of the Modem may represent a specific SNR of a modulated signal output from the receiver 100 to the modem which makes a block error rate (BLER) of a demodulated signal output from the Modem equal to a specific value (e.g. 5%). According to the equation eq7 and the parameters derived in the embodiments of FIG. 4 and FIG. 5 (e.g. the ideal gain $G_{ideal2}$ of the receiver 100, the SNR requirement $\text{SNR}_{req}$ of the Modem, the pathloss $L_{pathloss}$ and the DFE noise power $\text{Noise}_{DFE}$), the sensitivity of the receiver 100 may be calculated as follows:

$$\text{Sensitivity} = -(G_{ideal2} - L_{pathloss}) + \text{Noise}_{DFE} + \text{SNR}_{req} \quad (eq8)$$

It should be noted that the output test signal $P_{out}$ is generated on the output node N1 during the calibration stage, and the DFE noise power $\text{Noise}_{DFE}$ is measured on the output node N2. The digital filter 135 may process a signal without contributing any path loss or less likely to contribute a path loss. Thus, even though the output nodes N1 and N2 are different nodes, the path loss from the antenna port 111 to the node N1 is equal or similar to the path loss from the antenna port 111 to the node N2. In addition, an ideal gain contributed by the digital filter 135 is typically known information (which can be derived according to coefficients of the digital filter 135). Thus, the ideal gain $G_{ideal2}$ may be derived according to the ideal gain $G_{ideal1}$ (which is typically predetermined information when designing the receiver 100) and the ideal gain of digital filter 135. As mentioned above, the software module 42 may calculate the measured gain (e.g. the real gain from the antenna port 111 to the output node N1) according to the input test signal $P_{in}$ and the output test signal $P_{out}$ (e.g. the digital raw data Dout1 received from the output node N1), and then calculate the path loss $L_{pathloss}$ (which may be regarded as the path loss from the antenna port 111 to any of the output nodes N1 and N2) according to the ideal gain $G_{ideal}$ from the antenna port 111 to the output node N1 and the measured gain.

It should be noted that the path loss $L_{pathloss}$ can be derived from existing flow such as the RSSI calibration, which means the present invention does not need to introduce additional costs for deriving the path loss $L_{pathloss}$. Similarly, other information such as the ideal gain $G_{ideal2}$ and the SNR requirement $\text{SNR}_{req}$ of the Modem are existing information which is derived from other existing design flows or test flows. Thus, after the DFE noise power $\text{Noise}_{DFE}$ are measured and derived under a condition of connecting the 50-ohm load 30 to the antenna port 111, the host device 40 (e.g. the software module 42) may have sufficient information to calculate the sensitivity of the receiver 100. Thus, problems of the related art (e.g. synchronization requirement) can be solved.

In addition to the information mentioned above in equation eq8, because the level of the modulated signal which may be correctly demodulated is referred to as a sensitivity level of the receiver, a correction factor $\alpha$ may be considered. More particularly, the software module 42 may calculate the sensitivity of the receiver 100 according to $L_{pathloss}$, $\text{Noise}_{DFE}$ and the correction factor $\alpha$, wherein the correction factor $\alpha$ may represent a difference between an average frequency response (which is derived according to the coefficients of the digital filters 132, 134, 135 and the low pass filter 122) of a modulation signal over the whole second frequency range and a frequency response (which is derived according to the coefficients of the digital filters 132, 134, 135 and the low pass filter 122) of a tone related with the output test signal $P_{out}$. The modulation signal is a specific modulation signal that complies with a requirement of the sensitivity testing. Thus, the software module 42 may calculate the sensitivity of the receiver 100 as follows:

$$\text{Sensitivity} = -(G_{ideal2} - L_{pathloss}) + \text{Noise}_{DFE} + \text{SNR}_{req} + \alpha$$

If the tone of the output test signal $P_{out}$ is within the second frequency range, the correction factor $\alpha$ is determined according to an average frequency response of the modulation signal over the whole second frequency range and a frequency response of the tone of the output test signal $P_{out}$.

If the tone of the output test signal $P_{out}$ is not within the second frequency range, the two path losses corresponding to the two tones closest to the first frequency range are used to perform an interpolation or an extrapolation to obtain a new path loss. The new path loss corresponds to the frequency response of a tone. Then, the correction factor $\alpha$ is determined according to an average frequency response of the modulation signal over the whole second frequency range and a frequency response of the tone related with the output test signal Pout.

In some embodiment, the sensitivity of the receiver may be calculated based on measurement of the output SNR $\text{SNR}_{out}$ as illustrated by the following equation:

$$\text{Sensitivity} = \quad (eq9)$$
$$SGP_{ant} - (SGP_{DFE} - \text{Noise}_{DFE}) + \text{SNR}_{req} = SGP_{ant} - SNR_{out} + SNR_{req}$$

The antenna signal power $SGP_{ant}$ (the power of the input test signal $P_{in}$) is controllable and measurable (which can be derived in advance), and the SNR requirement $SNR_{req}$ may be existing information, as mentioned above. Thus, the sensitivity of the receiver can be derived after the output SNR $SNR_{out}$ is measured (e.g. calculated according to the DFE signal power $SGP_{DFE}$ and the DFE noise power $Noise_{DFE}$).

Figure 6:
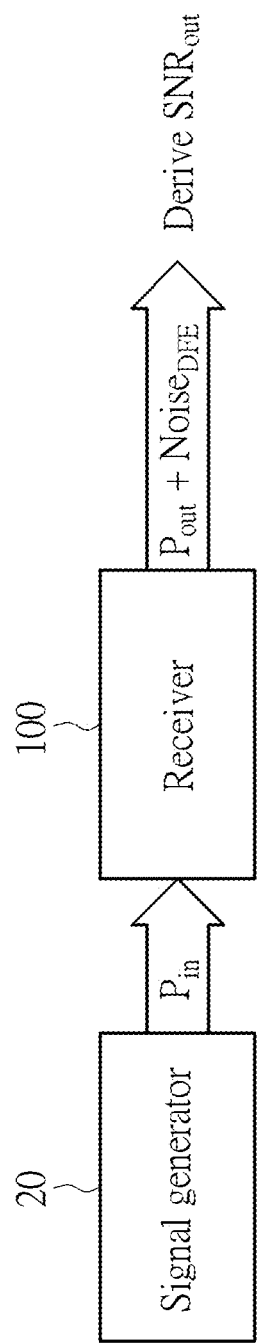
FIG. 6 is a diagram illustrating estimation of an output signal-to-noise ratio of a receiver according to an embodiment of the present invention.

FIG. 6 is a diagram illustrating estimation of an output signal-to-noise ratio of a receiver according to an embodiment of the present invention. As shown in FIG. 6, the receiver 100 may receive the input test signal $P_{in}$ via an input port thereof (e.g. the antenna port 111) from the signal generator 20, and the receiver 100 may generate the output test signal $P_{out}$ including the DFE noise power $Noise_{DFE}$ according to the input test signal $P_{in}$. By analyzing the output test signal $P_{out}$ from the receiver 100, the output SNR $SNR_{out}$ can be derived in order to calculate the sensitivity of the receiver 100 according to the equation eq9.

Figure 7:
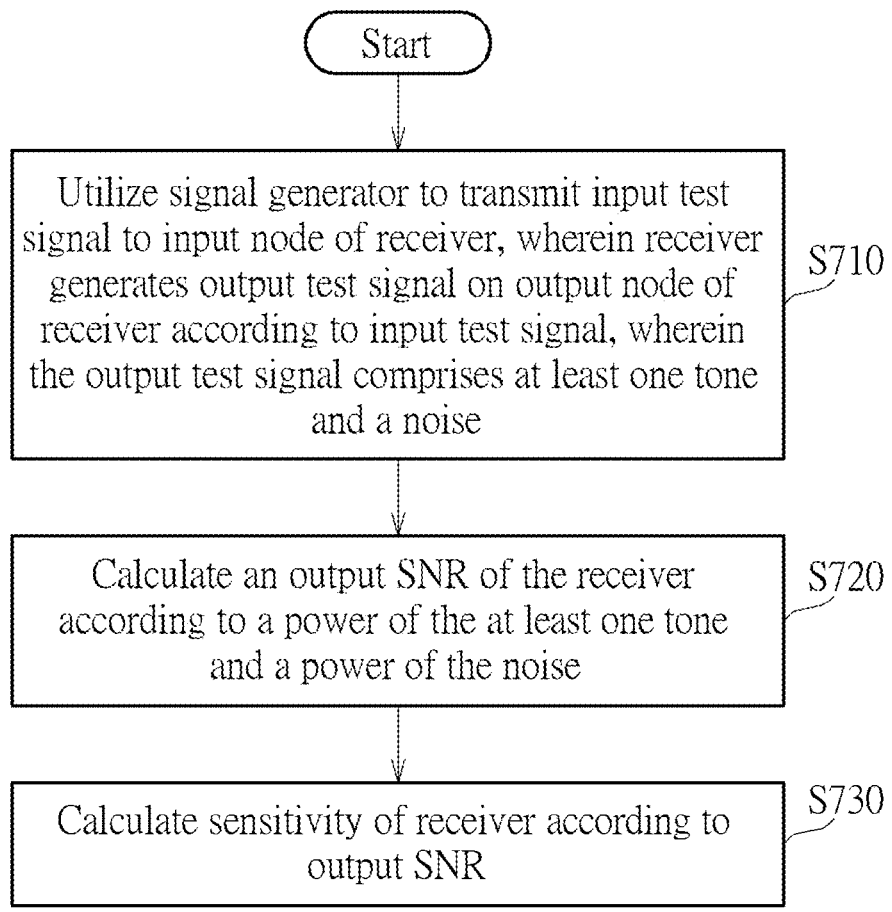
FIG. 7 is a diagram illustrating a working flow of a method for measuring a sensitivity of a receiver according to an embodiment of the present invention.

FIG. 7 is a diagram illustrating a working flow of a method for measuring a sensitivity of a receiver (e.g. the receiver 100) according to an embodiment of the present invention, where the working flow shown in FIG. 7 may be controlled by a host device such as a computer executing corresponding software module and/or management engine. The management engine is also referred to as a power measurement engine. It should be noted that the working flow shown in FIG. 7 is for illustrative purposes only, and is not meant to be a limitation of the present invention. For example, one or more steps may be added, deleted or modified in the working flow shown in FIG. 7. In addition, if a same result can be obtained, these steps do not have to be executed in the exact order shown in FIG. 7.

In Step S710, the host device may control a signal generator (e.g. the signal generator 20 shown in FIG. 6) to transmit an input test signal (e.g. the input test signal $P_{in}$ shown in FIG. 6) to an input node of the receiver (e.g. the receiver 100 shown in FIG. 6), wherein the receiver generates an output test signal (e.g. the output test signal $P_{out}$ shown in FIG. 6) on an output node of the receiver according to the input test signal, wherein the output test signal comprises at least one tone and a noise, wherein the at least one tone is a single tone or multiple tones.

In Step S720, the host device may calculate an output SNR (e.g. the output $SNR_{out}$) of the receiver according to a power of the at least one tone and a power of the noise.

In Step S730, the host device may calculate the sensitivity of the receiver according to the output SNR.

Figure 8:
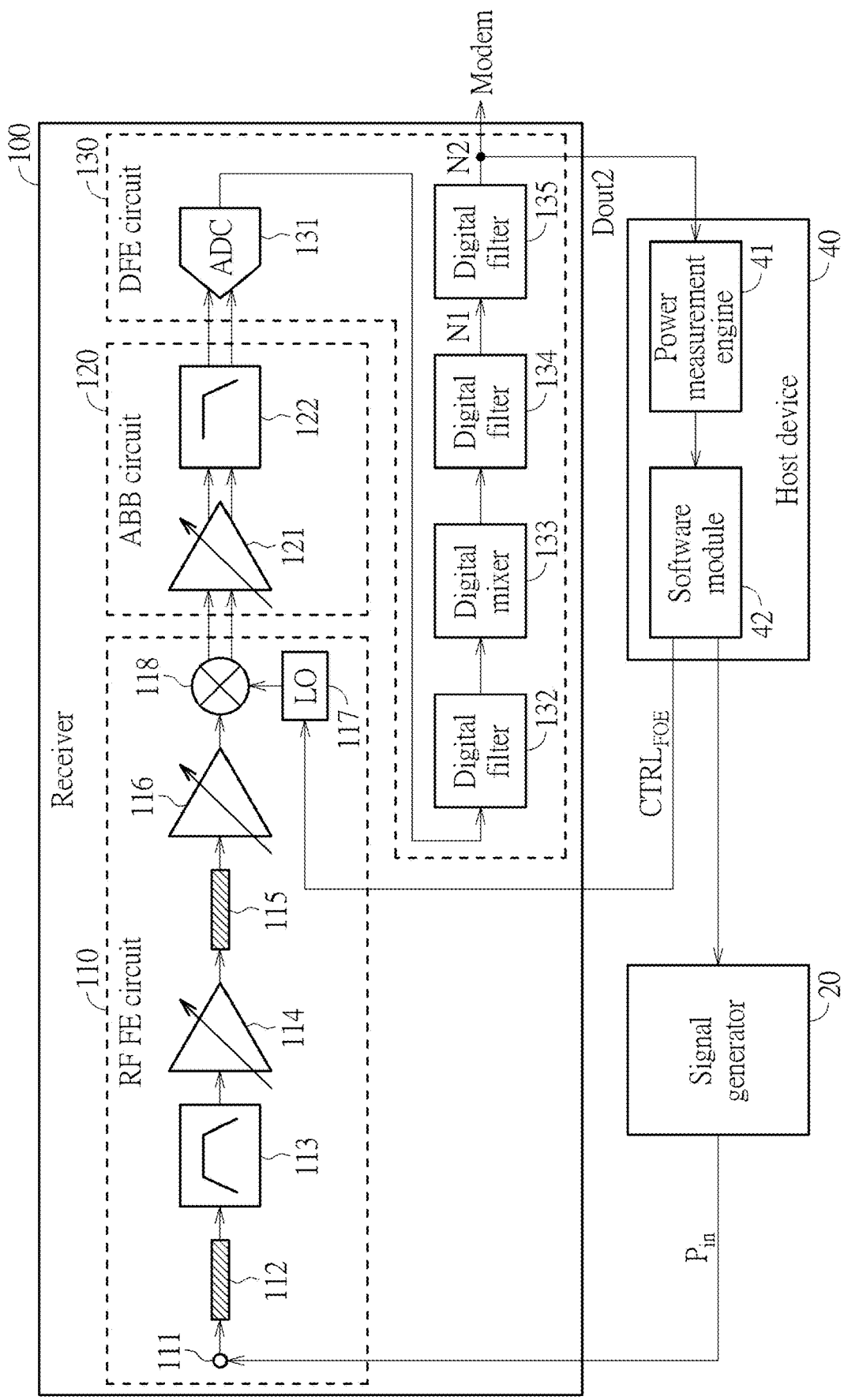
FIG. 8 is a diagram illustrating some details of estimation of an output signal-to-noise ratio of a receiver according to an embodiment of the present invention.

FIG. 8 is a diagram illustrating some details of estimation of the output SNR $SNR_{out}$ of the receiver 100 according to an embodiment of the present invention, where the host device 40 may be configured to execute the software module 42, in order to control operations of the method shown in FIG. 7. Similar to the embodiment of FIG. 4, the signal generator 20 may be coupled to the antenna port 111, and more particularly, the host device 40 (which executing the software module 42 and power measurement engine 41) may control the signal generator 20 to output the input test signal $P_{in}$ with a predefined power (e.g. settings of the signal generator 20). As mentioned above, the power of the input test signal $P_{in}$ (e.g. the antenna signal power $SGP_{ant}$) can be obtained based on the predefined power and pathloss between the signal generator 20 and the antenna port 111, or the host device 40 (e.g. the power measurement engine 41) may measure the power of the input test signal $P_{in}$ (e.g. the antenna signal power $SGP_{ant}$) by probing the antenna port 111, but the present invention is not limited thereto. In some embodiment, the input test signal $P_{in}$ may be a single continuous wave tone. In some embodiment, the input test signal $P_{in}$ may be a signal with multiple tones.

In this embodiment, the input test signal $P_{in}$ (which may be fixed at a constant power level) may be transferred and processed by the components within the receiver 100 stage by stage, and the receiver 100 may generate an output test signal such as the digital raw data Dout2 (which may be an example of the output test signal $P_{out}$ shown in FIG. 8) on the output node N2 according to the input test signal $P_{in}$. The host device 40 may receive the digital raw data Dout2. In particular, the host device 40 may perform frequency offset estimation (FOE) according to the digital raw data Dout2, in order to obtain a frequency offset $\Delta f$, and the host device 40 may apply the frequency offset $\Delta f$ to the LO 117 within the receiver 100, in order to adjust an oscillation frequency of the LO 117, wherein the frequency offset represents the difference between the frequency of tone of the output test signal $P_{out}$ and a desired frequency of tone of the output test signal. Note that the digital raw data Dout2 utilized for calculating the output SNR $SNR_{out}$ are measured after the oscillation frequency of the LO 117 is adjusted. In detail, the host device 40 may calculate a first FFT result of the digital raw data Dout2 according to a first FFT window with a FFT size N (e.g. according to a specific number of values of the digital raw data Dout2 during a first period), and calculate a second FFT result of the digital raw data Dout2 according to a second FFT window with the FFT size N (e.g. according to the specific number of values of the digital raw data Dout2 during a second period). The host device 40 then calculates a phase difference $\Delta\varphi$ between a bin of the first FFT result and the bin of the second FFT result, and calculates the frequency offset $\Delta f$ according to the phase difference $\Delta\varphi$ and the FFT size N, wherein the bin of the first FFT result and the bin of the second FFT result corresponds to the tone of the output test signal. For example, the frequency offset $\Delta f$ may be derived according to the following equation:

$$\Delta f + f_0 = \frac{\Delta\varphi}{2 \times \pi \times \Delta T} \quad (eq10)$$

In the equation eq10, $f_0$ represents the desired frequency of tone of the output test signal, $\pi$ represents a mathematical constant that is the ratio of a circle's circumference to its diameter, and $\Delta T = N/a$ sampling frequency. By performing the FOE, the frequency of the tone of the output test signal equals to the desired frequency of the tone of the output test signal, such that the power of the tone of the output test signal is less likely to spread to adjacent frequencies.

After the FOE is completed, the host device 40 (e.g. the power measurement engine 41) may receive the digital raw data Dout2 in order to calculate the output $SNR_{out}$ according to the digital raw data Dout2. In detail, the power measurement engine 41 may perform the FFT upon the digital raw data Dout2 from the output node N2 in order to generate a final FFT result, where the output signal power $S_{out}$ (e.g. the DFE signal power $SGP_{DFE}$) may be derived at a corresponding FFT frequency bin (e.g. a FFT frequency bin corresponding to a frequency of tone of the output test signal) from the final FFT result, and the power measurement engine 41 may derive the output noise power $N_{out}$ (e.g. the DFE noise power $Noise_{DFE}$) by integrating noise powers within the final FFT result in a second frequency range corresponds to a first frequency range on which the sensitivity needs to be measured. In some embodiments, assuming that the predetermined test tone frequency (which corresponds to the FFT bin representing the DFE signal power $SGP_{DFE}$) is located at a right-half of the second frequency range, the power measurement engine 41 may integrate the noise power on a left-half of the second frequency range without including a direct-current (DC) tone therein, in order to generate an integration result, wherein this integration result may be doubled in order to derive the DFE noise power $Noise_{DFE}$. In some embodiment, assuming that the predetermined test tone frequency is located at the left-half of the second frequency range, the power measurement engine 41 may integrate the noise power on the right-half of the second frequency range without including the DC tone therein, in order to generate an integration result, wherein this integration result may be doubled in order to derive the DFE noise power $Noise_{DFE}$. In some embodiment, the power measurement engine 41 may integrate the noise power on the whole second frequency range without including the DC tone and the test tone (which is the tone of the output test signal) therein, in order to generate an integration result. When the input test signal $P_{in}$ is a single tone, the integration result may be multiplied by ($Size_{bin}/(Size_{bin}-2)$) in order to derive the DFE noise power $Noise_{DFE}$. Alternatively, when the input test signal $P_{in}$ is a signal with multiple tones, the integration result may be multiplied by ($Size_{bin}/(Size_{bin}-(n+1))$) in order to derive the DFE noise power $Noise_{DFE}$, wherein n denotes the number of tones of multiple tones and $Size_{bin}$ denotes the number of bins in the second frequency range. The power measurement engine 41 transfers information of the output signal power $S_{out}$ and the DFE noise power $Noise_{DFE}$ to the software module 42. The number of tones in the output test signal equal to the number of tones in the input test signal.

In addition to the information mentioned above, because the level of the modulated signal which may be correctly demodulated is referred to as a sensitivity level of the receiver, a correction factor $\alpha$ may be considered. More particularly, the software module 42 may calculate the sensitivity of the receiver 100 according to the output SNR $SNR_{out}$ and the correction factor $\alpha$. For example, the correction factor $\alpha$ may represent a difference between an average frequency response (which is derived according to the coefficients of the digital filters 132, 134, 135 and the low pass filter 122) of a modulation signal over the whole second frequency range and a frequency response (which is derived according to the coefficients of the digital filters 132, 134, 135 and the low pass filter 122) of a tone (e.g. the tone of the output test signal $P_{out}$). In view of above, the software module 42 may calculate the sensitivity of the receiver 100 according to the input signal power $S_{in}$ (e.g. the antenna signal power $SGP_{ant}$) of the input test signal $P_{in}$, the SNR requirement $SNR_{req}$ of the Modem coupled to the output node N2 of the receiver 100, the output SNR $SNR_{out}$ and the correction factor $\alpha$. More particularly, the SNR requirement $SNR_{req}$, the antenna signal power $SGP_{ant}$ and the correction factor $\alpha$ may be derived in advance as mentioned above. Thus, after the output $SNR_{out}$ are measured and calculated, the software module 42 may calculate the sensitivity of the receiver 100 as follows:

$$\text{Sensitivity} = SGP_{ant} - SNR_{out} + SNR_{req} + \alpha \qquad (eq11)$$

By using the equation eq9, the sensitivity of the receiver 100 can be derived without actually measure the BLER of the input test signal $P_{in}$ at different power levels, and the problems of the related art (e.g. synchronization requirement) can be solved.

To summarize, the embodiments of the present invention provide multiple approaches to estimate the sensitivity of the receiver 100 without involving operations of the Modem, for example, estimating based on measurement of the output noise power or the output SNR. Thus, there is no need for related synchronization of the Modem. In the embodiment related to FIG. 3, some required parameters such as the path loss, the SNR requirement of the Modem are typically existing information (which can be derived from other existing design flows or test flows). Furthermore, the signal generator is not needed during the self-test stage, thus the cost is saved. In the embodiment related to FIG. 7, only the instrument for generating a tone or a signal with multiple tones is required, and there is no need for the instrument for generating a modulated signal, thus the cost is saved. Furthermore, the sensitivity can be estimated without demodulation tasks, thereby simplifying an overall test flow.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for measuring a sensitivity of a receiver, comprising:
   during a first stage, controlling a signal generator to transmit an input test signal to an input node of the receiver, wherein an output test signal is generated by the receiver on a first output node of the receiver according to the input test signal;
   calculating a path loss from the input node of the receiver to the first output node of the receiver according to the input test signal and the output test signal;
   during a second stage, measuring an output noise power on a second output node of the receiver after a load is connected to the input node of the receiver; and
   calculating the sensitivity of the receiver according to the path loss and the output noise power.

2. The method of claim 1, wherein measuring the output noise power on the second output node of the receiver is performed under a condition where the receiver and the signal generator are disconnected.

3. The method of claim 1, wherein calculating the path loss of the receiver at the first output node of the receiver according to the input test signal and the output test signal comprises:
   calculating a measured gain according to the input test signal and the output test signal; and
   calculating the path loss according to a first predefined gain of the receiver and the measured gain, wherein the first predefined gain of the receiver is a predefined gain from the input node to the first output node.

4. The method of claim 1, wherein calculating the sensitivity of the receiver according to the path loss and the output noise power comprises:
   calculating the sensitivity of the receiver according to a second predefined gain of the receiver, signal-to-noise ratio (SNR) requirement of a demodulator coupled to the receiver, the path loss and the output noise power, wherein the second predefined gain of the receiver is a predefined gain from the input node to the second output node.

5. The method of claim 4, wherein the SNR requirement of the demodulator represents a specific SNR of a modulated signal output from the receiver which makes a block error rate (BLER) of a demodulated signal output from the demodulator equal to a specific value.

6. The method of claim 4, wherein calculating the sensitivity of the receiver according to the path loss and the output noise power further comprises:
calculating the sensitivity of the receiver according to the second predefined gain of the receiver, the SNR requirement of a demodulator coupled to the receiver, the path loss, the output noise power and a correction factor, wherein the correction factor indicates a difference between an average frequency response of a modulation signal over a second frequency range and a frequency response of a tone related with the output test signal, the output noise power is measured at the second frequency range, and the second frequency range corresponds to a first frequency range on which the sensitivity needs to be measured.

7. The method of claim 6, wherein $G_{ideal}$ represents the second predefined gain of the receiver, $SNR_{req}$ represents the SNR requirement of the demodulator, $L_{pathloss}$ represents the path loss, $Noise_{DFE}$ represents the output noise power, $\alpha$ represents the correction factor and the sensitivity of the receiver is $(-(G_{ideal}-L_{pathloss})+Noise_{DFE}+SNR_{req}+\alpha)$.

8. The method of claim 1, wherein the input test signal is a signal with a single tone or a signal with multiple tones.

9. The method of claim 1, wherein a frequency of the input test signal is within a first frequency range on which the sensitivity needs to be measured or adjacent to the first frequency range.

10. The method of claim 1, wherein the first output node of the receiver is located at a digital front-end (DFE) of the receiver, and the second output node of the receiver is located at the DFE of the receiver, wherein the second output node is not the same as the first output node.

11. The method of claim 1, wherein the first output node and the second output node are located after a digital filter in the receiver, wherein the filter is arranged for filtering a noise of outside of a second frequency range, and the second frequency range corresponds to a first frequency range on which the sensitivity needs to be measured.

12. A method for measuring a sensitivity of a receiver, comprising:
controlling a signal generator to transmit an input test signal to an input node of the receiver, wherein an output test signal is generated by the receiver on an output node of the receiver according to the input test signal, and the output test signal comprises at least one tone and a noise, wherein the at least one tone is a single tone or multiple tones;
calculating an output signal-to-noise ratio (SNR) of the receiver according to a power of the at least one tone and a power of the noise; and
calculating the sensitivity of the receiver according to the output SNR.

13. The method of claim 12, further comprising:
performing a frequency offset estimation according to the output test signal, in order to obtain a frequency offset; and
applying the frequency offset to a local oscillator (LO) within the receiver, in order to adjust an oscillation frequency of the LO;
wherein the output test signal utilized for calculating the output SNR is measured after the oscillation frequency of the LO is adjusted.

14. The method of claim 12, wherein calculating the sensitivity of the receiver according to the output SNR comprises:
calculating the sensitivity of the receiver according to an input signal power of the input test signal, SNR requirement of a demodulator coupled to the receiver, and the output SNR.

15. The method of claim 12, wherein the input test signal is a signal with a single tone or a signal with multiple tones.

16. The method of claim 12, wherein calculating the sensitivity of the receiver according to the output SNR comprises:
calculating the sensitivity of the receiver according to the output SNR and a correction factor;
wherein the factor indicates a difference between an average frequency response of a modulation signal over a second frequency range and a frequency response of a tone of the output test signal, and the second frequency range corresponds to a first frequency range on which the sensitivity needs to be measured.

17. The method of claim 16, wherein $SGP_{ant}$ represents the input signal power, $SNR_{req}$ represents the SNR requirement of the demodulator, $SNR_{out}$ represents the output SNR, $\alpha$ represents the correction factor, and the sensitivity of the receiver is $(SGP_{ant}-SNR_{out}+SNR_{req}+\alpha)$.

18. The method of claim 12, wherein the noise is within a second frequency range, wherein the second frequency range corresponds to a first frequency range on which the sensitivity needs to be measured, and the power of the noise within the second frequency range is obtained by:
integrating the power of noise on the right-half of the second frequency range without including the DC tone therein to generate an integration result, when a tone of the output signal is located at the left-half of the second frequency range; and
doubling the integration result to derive the power of the noise over the second frequency range.

19. The method of claim 12, wherein the noise is within a second frequency range, wherein the second frequency range corresponds to a first frequency range on which the sensitivity needs to be measured, and the power of the noise within the second frequency range is obtained by:
integrating the power of noise on the left-half of the second frequency range without including the DC tone therein to generate an integration result, when a tone of the output signal is located at the right-half of the second frequency range; and
doubling the integration result to derive the power of the noise over the second frequency range.

20. The method of claim 12, wherein the noise is within a second frequency range, wherein the second frequency range corresponds to a first frequency range on which the sensitivity needs to be measured, and the power of the noise within the second frequency range is obtained by:
integrating the power of noise on the second frequency range excluding a DC and the tone in the output test signal; and
multiplying the integration result by $Size_{bin}/(Size_{bin}-(n+1))$, wherein n denotes the number of tones in the output test signal and $Size_{bin}$ denotes the number of bins the second frequency range.

* * * * *